US005294218A

United States Patent [19]

Fiorentini et al.

[11] Patent Number: 5,294,218

[45] Date of Patent: Mar. 15, 1994

[54] CENTRIFUGAL DISCHARGER FOR WASTE MATERIALS HAVING A LOW WEIGHT/AREA RATIO

[75] Inventors: Mauro Fiorentini, Granarolo Emilia; Bruno Belvederi, S. Martino Di Monte S. Pietro, both of Italy

[73] Assignee: G. D Societa' Per Azioni, Bologna, Italy

[21] Appl. No.: 865,989

[22] Filed: Apr. 9, 1992

[30] Foreign Application Priority Data

Apr. 29, 1991 [IT] Italy ........................ BO91A 000138

[51] Int. Cl.[5] ........................ B65G 53/60

[52] U.S. Cl. ........................ 406/173; 55/309; 55/429; 55/460; 131/110; 131/305

[58] Field of Search ........................ 406/168, 173, 175; 55/309, 429, 460; 131/110, 305

[56] References Cited

U.S. PATENT DOCUMENTS 4,797,038 1/1989 Correard ........................ 406/138
5,009,684 4/1991 Johansson ........................ 55/340

FOREIGN PATENT DOCUMENTS 732840 6/1955 United Kingdom .
933936 8/1963 United Kingdom .
1333732 10/1973 United Kingdom .

*Primary Examiner*—David M. Mitchell
*Assistant Examiner*—Andrew C. Pike
*Attorney, Agent, or Firm*—Klauber & Jackson

[57] ABSTRACT

A centrifugal discharger, particularly for cigarette manufacturing and/or packing machines, for disposing of waste fibrous and/or sheet material inside a fluidtight bin; wherein a centrifugal separator presents a cylindrical lateral wall, the bottom portion of which is fitted in fluidtight manner inside the bin, and communicates with a chamber in the bin via a tangent discharge conduit and a number of through holes for mutually compensating the pressure in the centrifugal separator and the bin.

4 Claims, 1 Drawing Sheet

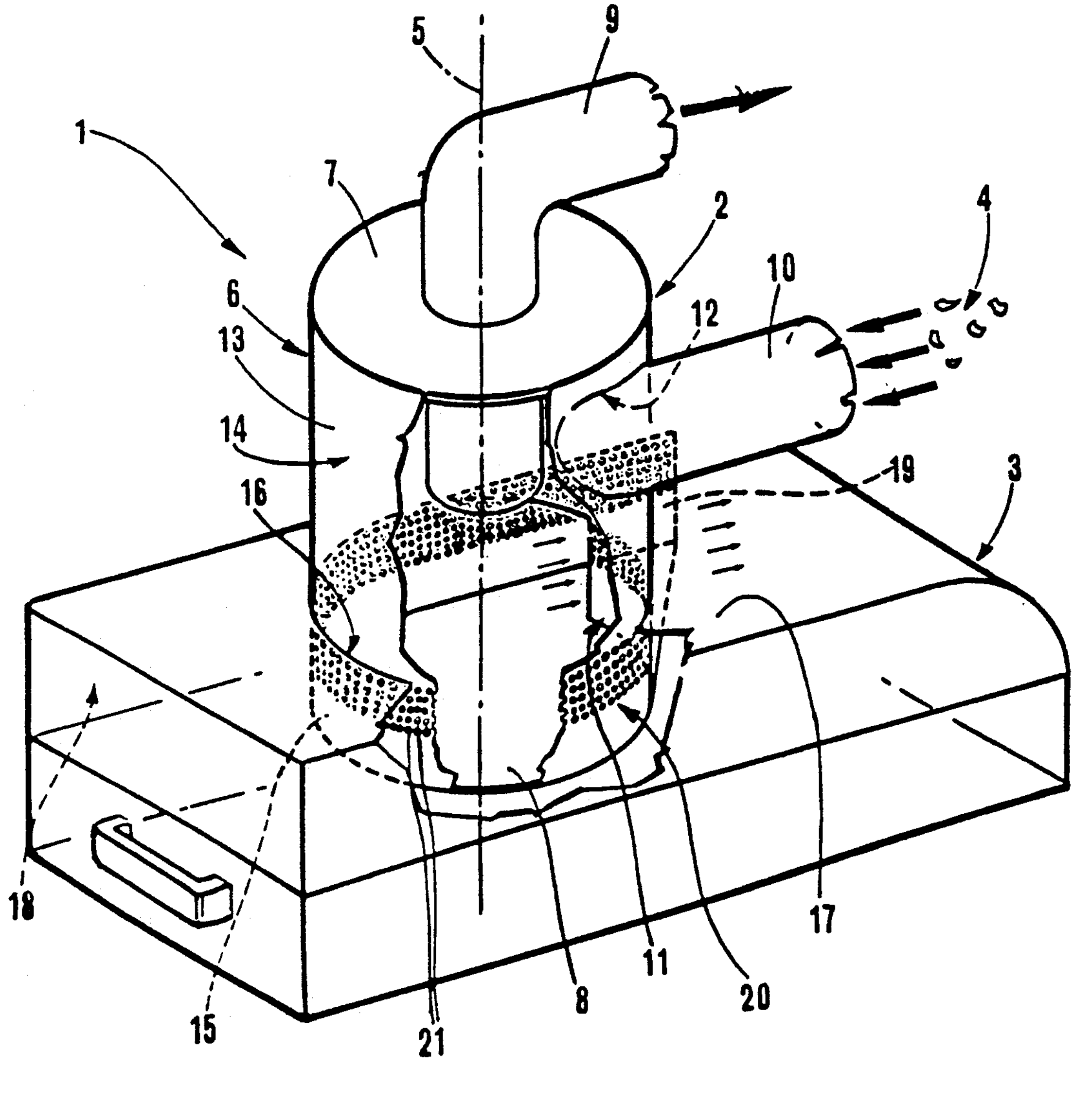
1
2
3
4
5
6
7
8
9
10
11
12
13
14
15
16
17
18
19
20
21

CENTRIFUGAL DISCHARGER FOR WASTE MATERIALS HAVING A LOW WEIGHT/AREA RATIO

BACKGROUND OF THE INVENTION

The present invention relates to a centrifugal discharger for waste materials having a low weight/area ratio.

In particular, the present invention relates to a centrifugal discharger for feeding waste material, especially fibrous or sheet material, into a fluidtight bin enabling pollutionfree disposal.

The centrifugal discharger according to the present invention is particularly suitable for machines manufacturing and/or packing products containing fibrous material, such as cigarettes, to which the following description refers purely by way of example.

Certain stations on cigarette manufacturing machines, and particularly filter assembly and packing machines, produce waste fibrous and/or sheet material that cannot be fed back into the process. A filter assembly machine, for example, employs bands for connecting the cigarettes to the filters, some of which, if already gummed, must be disposed of in the event of the machine breaking down.

Any unrecoverable waste is usually fed into a hopper having an output conduit from which the waste material is normally withdrawn by suction and fed into a fluidtight bin. For this purpose, provision is made, between the output conduit and the suction source, for a centrifugal separator having a normal conical portion at the bottom terminating in a discharge conduit communicating with the bin, for separating the waste material from the intake air and so feeding it into the bin.

Using a normal centrifugal separator, however, the above solution has proved unsatisfactory, due to the low weight/area ratio of the waste involved and the overpressure produced inside the bin, which result in large part of the waste spinning continually inside the separator and never reaching the bin.

SUMMARY OF THE INVENTION

A centrifugal discharger, particularly for cigarette manufacturing and/or packing machines, for disposing of waste fibrous and/or sheet material inside a fluidtight bin; wherein a centrifugal separator presents a cylindrical lateral wall, the bottom portion of which is fitted in fluidtight manner inside the bin, and communicates with a chamber in the bin via a tangent discharge conduit and a number of through holes for mutually compensating the pressure in the centrifugal separator and the bin.

It is an object of the present invention to provide a centrifugal discharger for effectively feeding waste material having a low weight/area ratio into a fluidtight bin.

According to the present invention, there is provided a centrifugal discharger for waste material having a low weight/area ratio, said discharger comprising a centrifugal separator having a discharge conduit; and a fluidtight waste bin communicating with said discharge conduit; characterized by the fact that the centrifugal separator comprises a cylindrical lateral wall having a vertical axis, penetrating in fluidtight manner inside said bin, and comprising a bottom portion inside the bin; said discharge conduit extending tangentially from said bottom portion of said lateral wall; and compensating means being provided for mutually compensating the pressure inside the centrifugal separator and the bin.

BRIEF DESCRIPTION OF THE DRAWING

The present invention will be described with reference to the accompanying drawing, which shows a view in perspective of a preferred non-limiting embodiment.

DETAILED DESCRIPTION OF THE INVENTION

Number 1 in the accompanying drawing indicates a centrifugal discharger mounted on a filter assembly machine (not shown) and comprising a centrifugal separator 2 connected to a bin 3 for waste material 4, in particular, small particles of fibrous and/or sheet material.

Separator 2 presents a vertical axis 5 and a cylindrical lateral wall 6 coaxial with axis 5 and closed at the top and bottom ends by respective transverse walls 7 and 8.

Separator 2 is connected to a known suction device (not shown) via a tubular suction conduit 9, the inlet portion of which is fitted through top wall 7 and extends inside separator 2, coaxial with axis 5 and in the direction of wall 8, for a length as specified in detail later on.

Separator 2 is also connected to a feedbox (not shown) for waste 4 by means of a conduit 10, the outlet end of which communicates with a chamber 11 inside separator 2 via an opening 12 formed in the top portion 13 of lateral wall 6. Opening 12 is located substantially tangent to the outer surface 14 of wall 6, and the distance between opening 12 and top wall 7 is less than the length of the portion of conduit 9 fitted inside chamber 11 through wall 7. As a result, the air and waste 4 sucked into chamber 11 along conduit 10 swirl about axis 5 to produce a central vacuum beneath the inlet of conduit 9, and pack waste 4 substantially contacting the inner surface of lateral wall 6. Substantially clean air is therefore sucked out along conduit 9, while waste 4 on the inner surface of wall 6 gradually swirls down towards bottom portion 15 of wall 6.

Bottom portion 15 of wall 6 engages in fluidtight manner an opening 16 formed through top wall 17 of bin 3, and is fitted entirely inside a fluidtight chamber 18 in bin 3. At bottom portion 15 of wall 6, chamber 11 communicates with chamber 18 via a discharge conduit 19 extending tangent to wall 6 and sloping perpendicular to axis 5.

As it swirls downwards, waste 4 should, in theory, go directly from chamber 11 into chamber 18 of bin 3 via conduit 19. In actual practice, however, it tends to remain inside chamber 11, due to the overpressure produced inside chamber 18, and the "sail effect" produced by the relatively low weight/area ratio of the waste, and which tends to keep it swirling inside chamber 11. This drawback is overcome by providing bottom portion 15 of wall 6 with a band 20 of through holes 21 extending over substantially the entire surface of bottom portion 15 and the outer lateral surface of discharge conduit 19.

Holes 21 provide for breaking the vortex and so drastically reducing the "sail effect" inside chamber 11, as well as for compensating the pressure of chambers 11 and 18, thus enabling waste 4 to be discharged from conduit 19 and tamped inside bin 3 substantially by centrifugal force alone.

We claim:

1. A centrifugal discharger (1) for waste material (4) having a low weight/area ratio, said discharger comprising a centrifugal separator (2) having a discharge conduit (19); and a fluidtight waste bin (3) communicating with said discharge conduit (19); characterized by the fact that the centrifugal separator (2) comprises a cylindrical lateral wall (6) having a vertical axis (5), penetrating in fluidtight manner inside said bin (3), and the centrifugal separator further comprising a bottom portion (15) inside the bin (3); said discharge conduit (19) extending tangentially from said bottom portion (15) of said lateral wall (6); and compensating means (21) being provided for mutually compensating the pressure inside the centrifugal separator (2) and the bin (3).

2. A centrifugal discharger as claimed in claim 1, characterized that said compensating means comprise a plurality of through holes (21) formed through said bottom portion (15) of said lateral wall (6).

3. A centrifugal discharger as claimed in claim 2, characterized by the fact that said through holes (21) form a band (20) extending over the whole of said bottom portion (15) of said lateral wall (6).

4. A centrifugal discharger as claimed in claim 3, characterized by the fact that said band (20) also extends along said discharge conduit (19).

* * * * *